US012591393B2

(12) United States Patent
Ishiguro

(10) Patent No.: US 12,591,393 B2
(45) Date of Patent: Mar. 31, 2026

(54) MEMORY SYSTEM AND METHOD

(71) Applicant: Kioxia Corporation, Tokyo (JP)

(72) Inventor: Takashi Ishiguro, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 196 days.

(21) Appl. No.: 18/535,956

(22) Filed: Dec. 11, 2023

(65) Prior Publication Data

US 2024/0248645 A1 Jul. 25, 2024

(30) Foreign Application Priority Data

Jan. 20, 2023 (JP) ................................. 2023-007389

(51) Int. Cl.
G06F 3/06 (2006.01)
(52) U.S. Cl.
CPC .......... G06F 3/0659 (2013.01); G06F 3/0679 (2013.01); G06F 3/0604 (2013.01)
(58) Field of Classification Search
CPC .... G06F 3/0659; G06F 3/0679; G06F 3/0604; G06F 3/0625; G06F 3/1221; G06F 2213/0026; G06F 13/1678; G06F 1/325; G06F 1/3275; G06F 1/3268; H04L 12/40169; H04L 12/40189; H04L 12/40182

See application file for complete search history.

(56) References Cited

U.S. PATENT DOCUMENTS

| | | | |
|---|---|---|---|
| 11,080,212 B2 | 8/2021 | Iyer et al. | |
| 2014/0244904 A1* | 8/2014 | Kondo | G06F 13/1684 |
| | | | 711/103 |
| 2017/0287534 A1 | 10/2017 | Chevallier et al. | |
| 2019/0250930 A1 | 8/2019 | Erez | |
| 2021/0042248 A1 | 2/2021 | Das Sharma | |
| 2024/0028223 A1* | 1/2024 | Watanabe | G06F 3/0679 |

* cited by examiner

*Primary Examiner* — Idriss N Alrobaye
*Assistant Examiner* — Richard B Franklin
(74) *Attorney, Agent, or Firm* — Maier & Maier, PLLC

(57) ABSTRACT
According to one embodiment, a memory system is connectable to a host. The memory system includes a nonvolatile memory and a controller. The controller is electrically connected to the nonvolatile memory. The controller determines lanes to be set to an operating state among a plurality of lanes of a link between the host and the memory system, based on first information on one or more commands issued by the host. The controller sets the determined lanes among the plurality of lanes to the operating state. The controller sets lanes other than the determined lanes among the plurality of lanes to a low power consumption state.

21 Claims, 6 Drawing Sheets

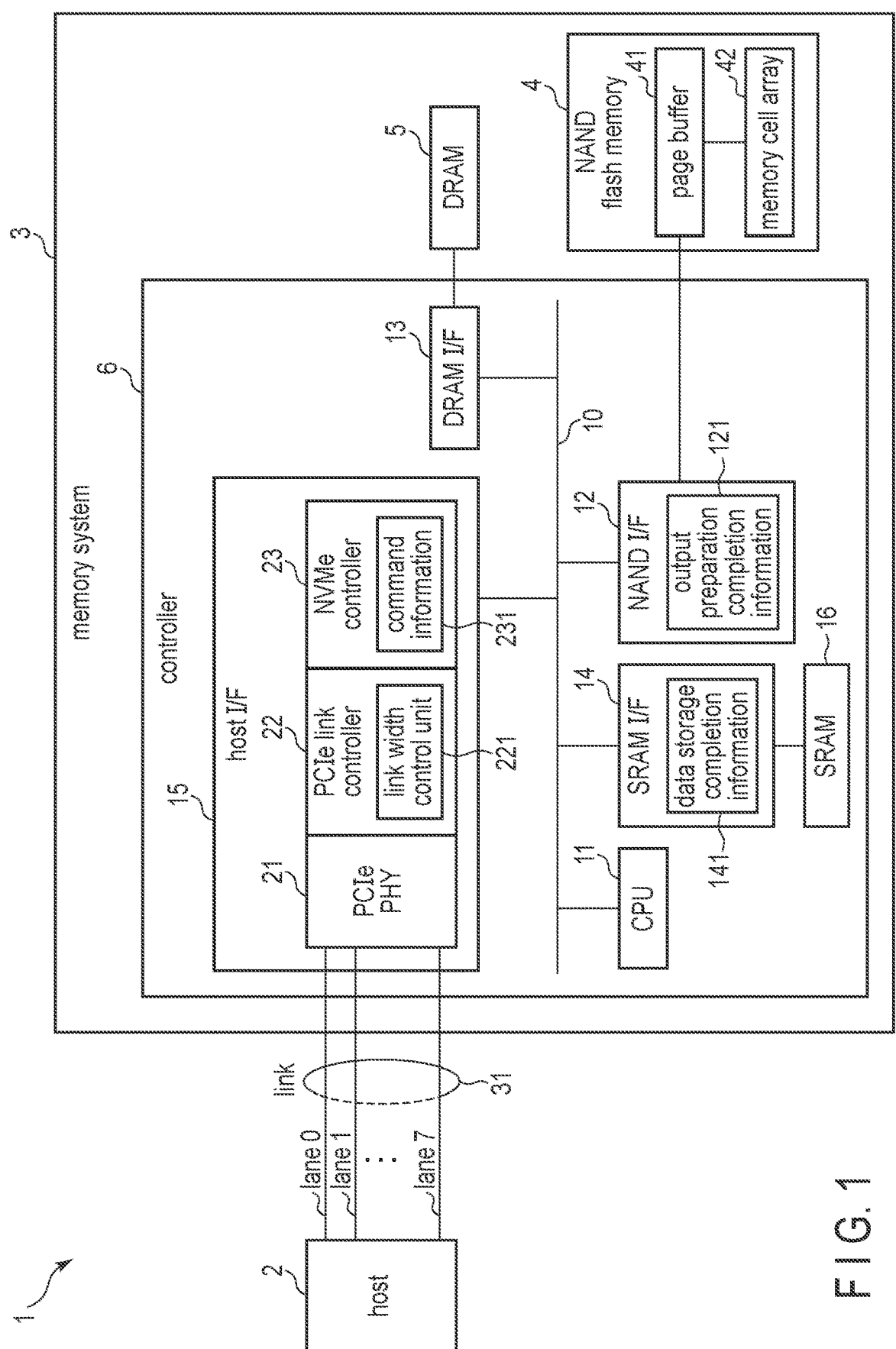
F I G. 1

| link width | active lane number | inactive lane number |
|---|---|---|
| ×1 | 0 | 1-7 |
| ×2 | 0-1 | 2-7 |
| ×4 | 0-3 | 4-7 |
| ×8 | 0-7 | n/a |

T1(transition of lane 1 of first group)

T2(transition of lanes 2-3 of second group)

T3(transition of lanes 4-7 of third group)

F I G. 2

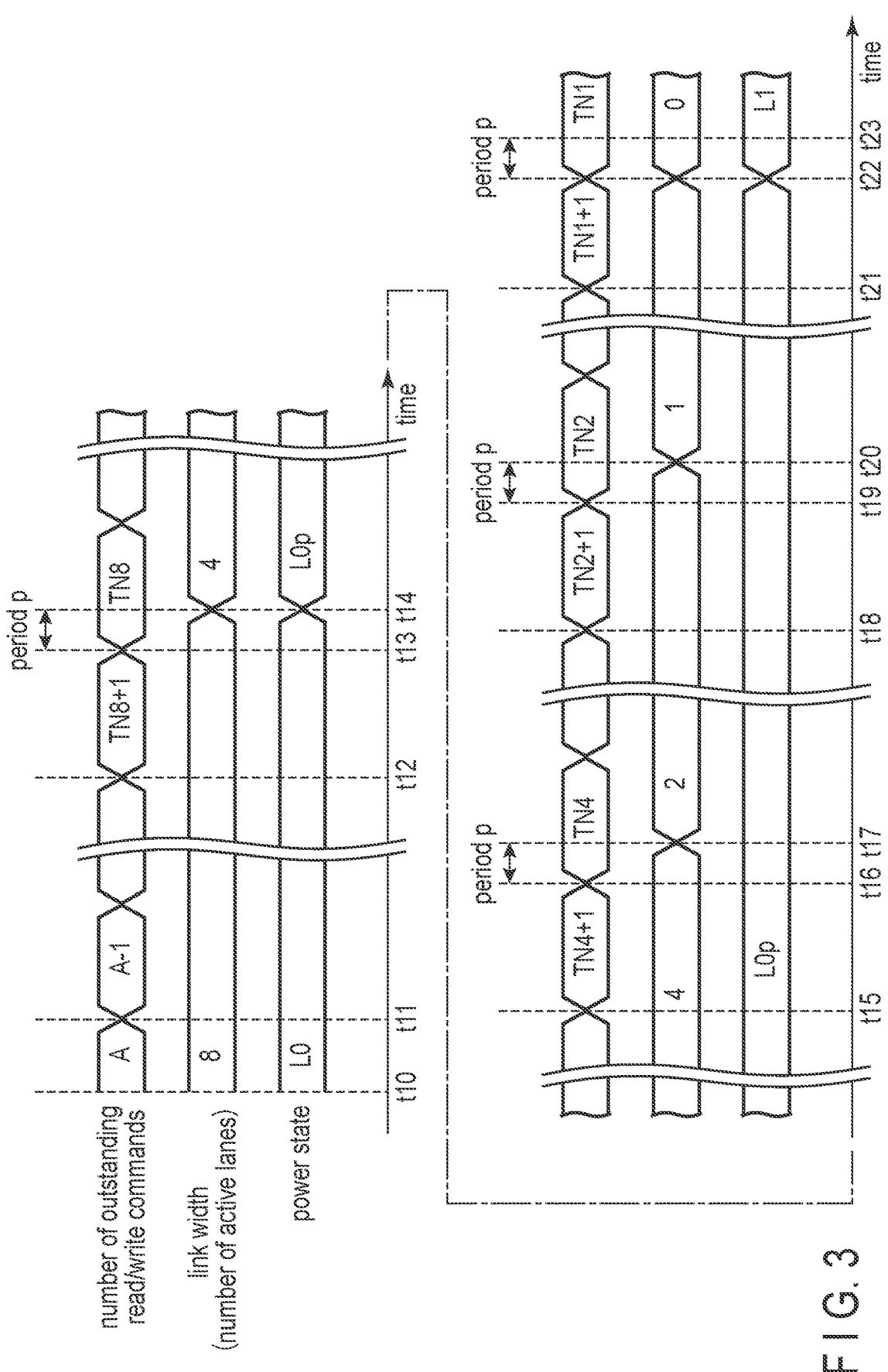
F I G. 3

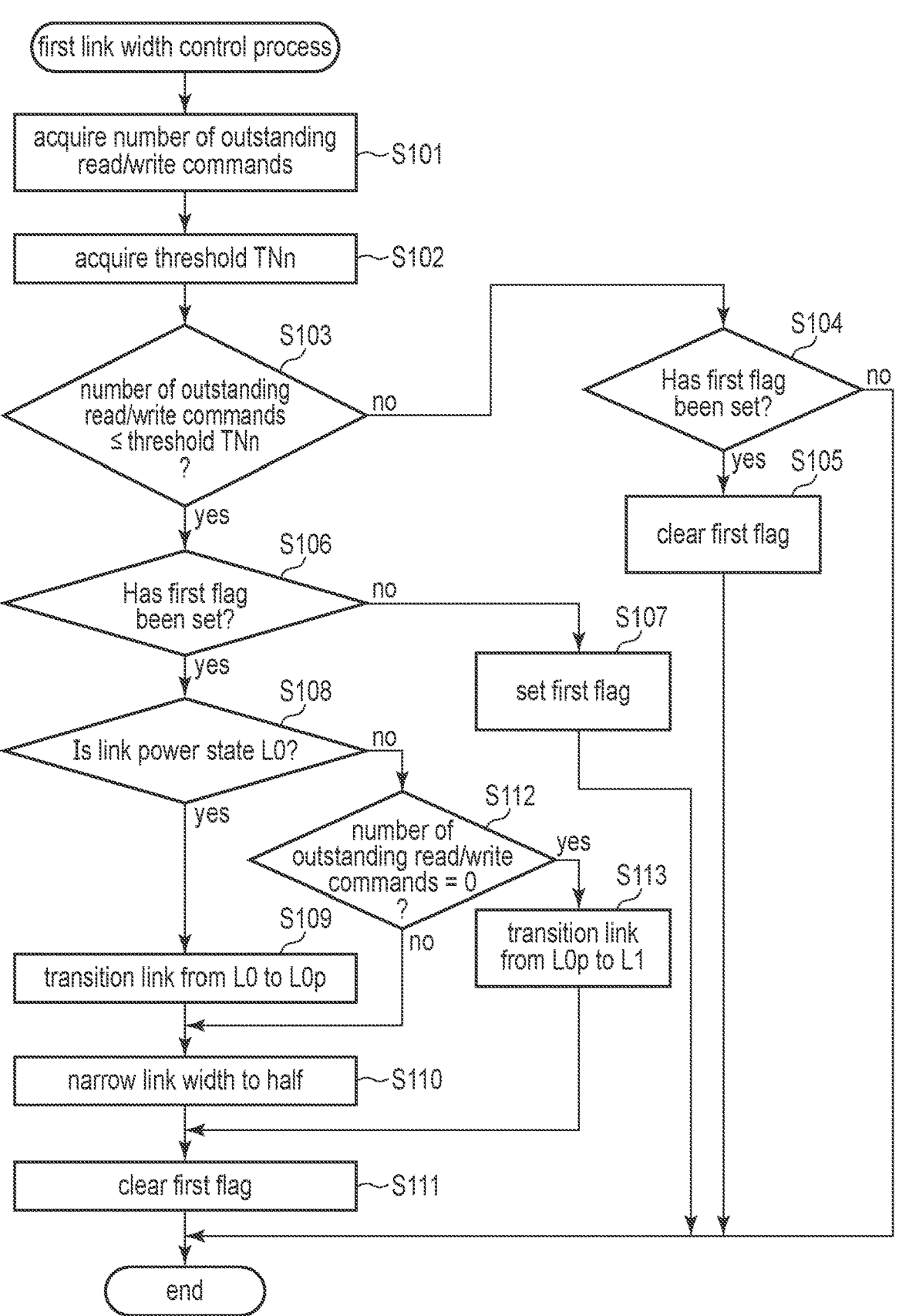
F I G. 4

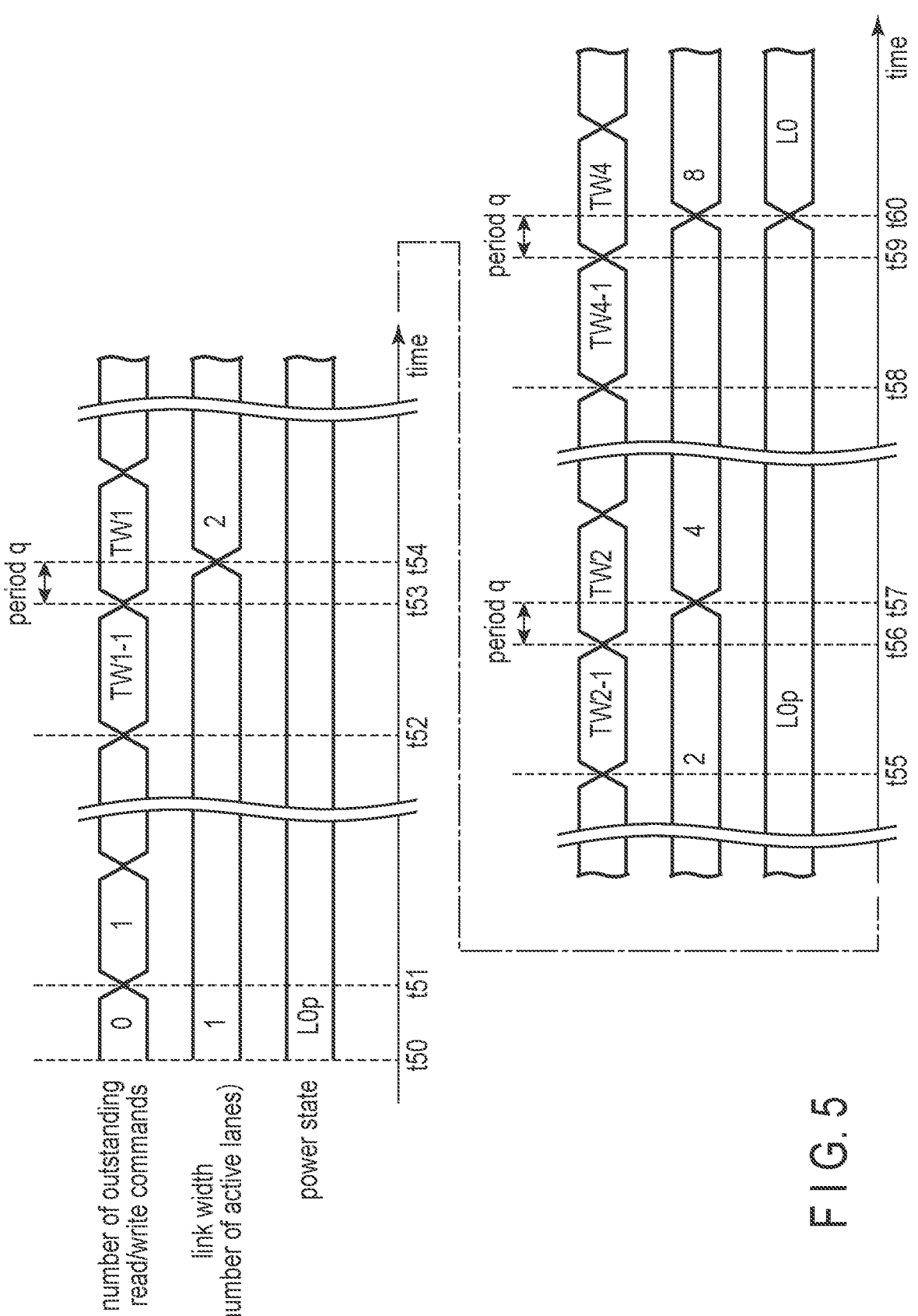
F I G. 5

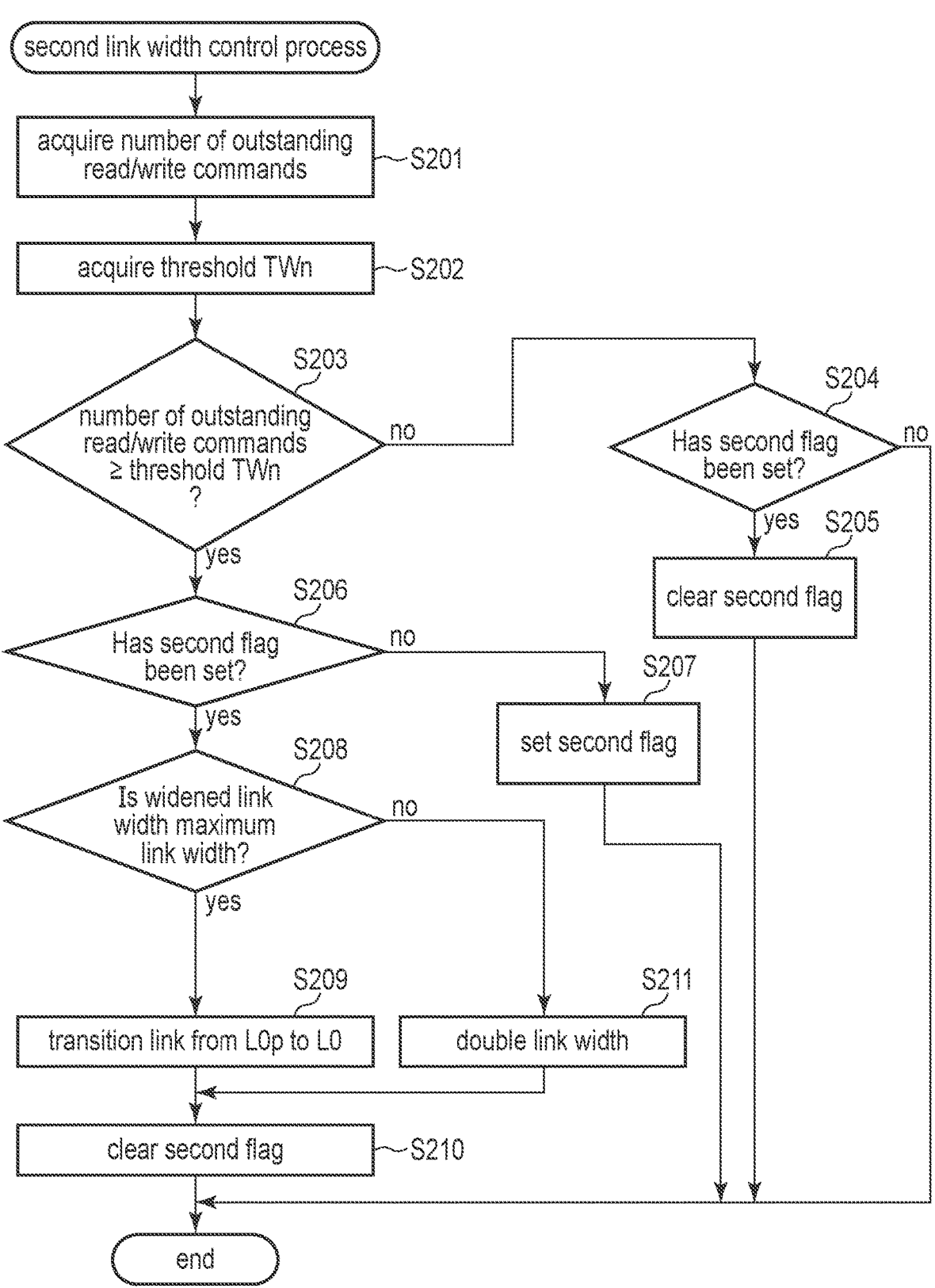
F I G. 6

MEMORY SYSTEM AND METHOD

CROSS-REFERENCE TO RELATED APPLICATIONS

This application is based upon and claims the benefit of priority from Japanese Patent Application No. 2023-007389, filed Jan. 20, 2023, the entire contents of which are incorporated herein by reference.

FIELD

Embodiments described herein relate generally to a technique for controlling a nonvolatile memory.

BACKGROUND

The PCI Express™ (PCIe™) standard is known as one of the interface standards for connecting a host and a memory system. With an interface conforming to the PCIe standard, the host and the memory system are connected via a transmission path that is referred to as a link. Over the link, data is transferred using a packet. The data transferred using a packet includes, for example, a request from the host to the memory system, a response from the memory system to the host, or user data.

The PCIe standard defines a function capable of setting the link to a low power consumption state even when the device is in an operating state. This function is referred to as an Active State Power Management (ASPM).

When there is no packet transfer over the link for a specific period of time, the device causes the link to transition from a normal operating state to the low power consumption state according to the ASPM function. In the PCIe standard, the normal operating state is defined as, for example, a link power state L0. The low power consumption state is defined as, for example, a link power state L1.

The PCIe Gen6 (PCIe 6.0 standard) newly specifies, in the link power state L0, a link power state L0p in a flow control unit (FLIT) mode. The link power state L0p is a link power state that enables data transfer and reduced power consumption. In the link power state L0p, power consumption may be reduced by dynamically controlling a link width. The link width is the number of lanes set in a normal operating state among a plurality of lanes included in the link.

BRIEF DESCRIPTION OF THE DRAWINGS

FIG. 1 is a block diagram illustrating an example of a configuration of an information processing system that includes a memory system according to an embodiment.

FIG. 2 is a diagram illustrating an example of states of lanes that are set in accordance with a link width, in the memory system according to the embodiment.

FIG. 3 is a time chart illustrating a first control example of the link width in the memory system according to the embodiment.

FIG. 4 is a flowchart illustrating an example of the procedure of a first link width control process executed in the memory system according to the embodiment.

FIG. 5 is a time chart illustrating a second control example of the link width in the memory system according to the embodiment.

FIG. 6 is a flowchart illustrating an example of the procedure of a second link width control process executed in the memory system according to the embodiment.

DETAILED DESCRIPTION

In general, according to one embodiment, a memory system is connectable to a host. The memory system includes a nonvolatile memory and a controller. The controller is electrically connected to the nonvolatile memory. The controller determines lanes to be set to an operating state among a plurality of lanes of a link between the host and the memory system, based on first information on one or more commands issued by the host. The controller sets the determined lanes among the plurality of lanes to the operating state. The controller sets lanes other than the determined lanes among the plurality of lanes to a low power consumption state.

Various embodiments will be described hereinafter with reference to the accompanying drawings.

First, with reference to FIG. 1, an example of a configuration of an information processing system 1 that includes a memory system according to a first embodiment will be described. The information processing system 1 includes a host device 2 and a memory system 3.

The host device 2 is an information processing device that stores data to the memory system 3. The host device 2 is, for example, a storage server that stores a large amount of various data to the memory system 3, or a personal computer. Hereinafter, the host device 2 is referred to as a host 2.

The memory system 3 is a semiconductor storage device configured to write data to a nonvolatile memory and read data from the nonvolatile memory. The nonvolatile memory is, for example, a NAND flash memory. The memory system 3 is also referred to as a storage device. The memory system 3 is realized, for example, as a solid state drive (SSD).

The memory system 3 may be used as a storage of the host 2. The memory system 3 may be connected to the host 2.

An interface for connecting the host 2 and the memory system 3 conforms to standards such as PCIe or NVM Express™ (NVMe™).

The memory system 3 includes, for example, a NAND flash memory 4, a dynamic random access memory (DRAM) 5, and a controller 6.

The NAND flash memory 4 includes one or more memory chips. Each of the memory chips includes a page buffer 41 and a memory cell array 42. The page buffer 41 is composed of, for example, a static random access memory (SRAM). The memory cell array 42 includes a plurality of blocks. Each of the blocks includes a plurality of memory cells that are each configured to store data in a non-volatile manner. The blocks each function as a minimum unit of a data erase operation. The block may also be referred to as an erase block or a physical block. Each of the blocks includes multiple pages. Each of the pages includes memory cells connected to a single word line. The pages each function as a unit of a data write operation and a data read operation. Note that a word line may also function as a unit of a data write operation and a data read operation.

In a data write operation, data received from the controller 6 is temporarily stored in the page buffer 41 and then programmed into the memory cell array 42. The operation of temporarily storing, in the page buffer 41, data received from the controller 6 is referred to as a data-in operation. The operation of programming, into the memory cell array 42, data temporarily stored in the page buffer 41 is referred to as a program operation.

In a data read operation, data read from the memory cell array 42 is temporarily stored in the page buffer 41 and then output to the controller 6. The operation of temporarily storing, in the page buffer 41, data read from the memory cell array 42 is referred to as a sense operation. The operation of outputting, to the controller 6, data temporarily stored in the page buffer 41 is referred to as a data-out operation.

The DRAM 5 is a volatile memory. A memory area of the DRAM 5 is allocated, for example, as a storage area of firmware (FW), and a cache area of a logical-to-physical address translation table. The memory area of the DRAM 5 may also be allocated as a buffer area that temporarily stores user data.

The controller 6 is a memory controller that controls the NAND flash memory 4 and the DRAM 5. The controller 6 is implemented with a circuit such as a system-on-a-chip (SoC).

The controller 6 includes, for example, a central processing unit (CPU) 11, a NAND interface circuit (NAND I/F) 12, a DRAM interface circuit (DRAM I/F) 13, an SRAM interface circuit (SRAM I/F) 14, a host interface circuit (host I/F) 15, and an SRAM 16. These CPU 11, NAND I/F 12, DRAM I/F 13, SRAM I/F 14, and host I/F 15 may be connected via a bus 10.

The CPU 11 is a processor configured to control the NAND I/F 12, the DRAM I/F 13, the SRAM I/F 14, and the host I/F 15. The CPU 11 performs various processes by executing the FW loaded from the NAND flash memory 4 onto the DRAM 5. The FW is a control program including instructions for causing the CPU 11 to execute the various processes. The CPU 11 may perform command processes to execute various commands from the host 2. The operation of the CPU 11 is controlled by the FW executed by the CPU 11. The function of each unit in the controller 6 may be realized by dedicated hardware in the controller 6 or may be realized by the CPU 11 executing the FW.

The NAND I/F 12 electrically connects the controller 6 and the NAND flash memory 4. The NAND I/F 12 conforms to an interface standard such as a toggle double data rate (DDR) or an open NAND flash interface (ONFI).

The NAND I/F 12 functions as a NAND control circuit configured to control the NAND flash memory 4. The NAND I/F 12 may be connected to the memory chips in the NAND flash memory 4 via multiple channels. By operating the memory chips in parallel, it is possible to broaden an access bandwidth between the NAND flash memory 4 and the controller 6.

The NAND I/F 12 is configured to send output preparation completion information 121 to each unit in the controller 6, for example, to the host I/F 15. The output preparation completion information 121 includes information indicating that user data to be read in accordance with a read command is ready to be output from the NAND flash memory 4. The user data read from the NAND flash memory 4 (more specifically, from the memory cell array 42) is sent, for example, to the SRAM 16 by a data-out operation and is temporarily stored in the SRAM 16. Note that, the user data read from the NAND flash memory 4 may also be sent to the DRAM 5 and temporarily stored in the DRAM 5. The NAND I/F 12 sends the output preparation completion information 121 to the host I/F 15, for example, in response to completion of a preparation for outputting the user data, which is to be read from the NAND flash memory 4 in accordance with the read command, to the SRAM 16 or the DRAM 5. The NAND I/F 12 sends the output preparation completion information 121 to the host I/F 15, for example, in response to completion of a sense operation in accordance with the read command.

The DRAM I/F 13 functions as a DRAM control circuit configured to control access to the DRAM 5.

The SRAM I/F 14 functions as an SRAM control circuit configured to control the SRAM 16. The SRAM 16 is a volatile memory. A memory area of the SRAM 16 is allocated, for example, as a buffer area (data buffer) for temporarily storing user data. The user data stored in the SRAM 16 is, for example, user data to be written into the NAND flash memory 4 in accordance with a write command and user data read from the NAND flash memory 4 in accordance with a read command. The user data to be written into the NAND flash memory 4 in accordance with a write command is also referred to as write data. The user data read from the NAND flash memory 4 in accordance with a read command is also referred to as read data.

The SRAM I/F 14 is configured to send data storage completion information 141 to each unit in the controller 6, for example, to the host I/F 15. The data storage completion information 141 includes at least one of information indicating that storage of write data in the SRAM 16 has been completed and information indicating that storage of read data in the SRAM 16 has been completed. Specifically, the SRAM I/F 14 sends the data storage completion information 141 to the host I/F 15, for example, in response to completion of storing write data in the SRAM 16. The SRAM I/F 14 sends the data storage completion information 141 to the host I/F 15, for example, in response to completion of preparing a data-in operation for the write data. The SRAM I/F 14 also sends the data storage completion information 141 to the host I/F 15, for example, in response to completion of storing read data in the SRAM 16. The SRAM I/F 14 sends the data storage completion information 141 to the host I/F 15, for example, in response to completion of a data-out operation for the read data.

Note that, in a case where write data is stored in the DRAM 5, the DRAM I/F 13 sends, to host I/F 15, information indicating that storage of the write data in the DRAM 5 has been completed. In a case where read data is stored in the DRAM 5, the DRAM I/F 13 sends, to the host I/F 15, information indicating that storage of the read data in the DRAM 5 has been completed.

Hereinafter, a case where write data and read data are stored in the SRAM 16 will be explained as an example.

The host I/F 15 is a circuit that functions as an interface that performs communication between the memory system 3 and the host 2. The host I/F 15 includes a circuit for transmitting a packet to the host 2 and a circuit for receiving a packet from the host 2. The packets are, for example, packets conforming to the PCIe standard. The packets each include, for example, a command, a response, or user data. The command is, for example, an input/output (I/O) command or a control command. The I/O command is, for example, a read command or a write command.

The host I/F 15 includes, for example, a PCIe PHY 21, a PCIe link controller 22, and an NVMe controller 23.

The PCIe PHY 21 is a circuit connected to the host 2 via a serial interface. This serial interface includes a link 31 capable of interconnecting the host 2 and the memory system 3. The PCIe PHY 21 corresponds to a physical layer defined in the PCIe standard. The PCIe PHY 21 supports a physical connection form that, for example, conforms to the PCIe standard. The PCIe PHY 21 performs an interface operation for physically transmitting and receiving data via the link 31.

The link 31 is composed of a plurality of lanes. Each of the lanes is a pair of a signal line for signals transferred from the host 2 to the memory system 3 and a signal line for signals transferred from the memory system 3 to the host 2. Each of the lanes is identified by, for example, a lane number. FIG. 1 illustrates a case where the link 31 is composed of eight lanes of a lane 0, a lane 1, . . . , and a lane 7. The lane 0, the lane 1, . . . , and the lane 7 are, for example, identified by lane numbers from 0 to 7, respectively.

The PCIe link controller 22 is a circuit that manages the link 31 and performs processes for exchanging data between the PCIe PHY 21 and the NVMe controller 23. More specifically, the PCIe link controller 22 receives a packet from the host 2 via the link 31 and the PCIe PHY 21. The PCIe link controller 22 processes the packet, thereby acquiring, for example, data to be sent to the NVMe controller 23. The PCIe link controller 22 sends the acquired data to the NVMe controller 23. The data to be sent to the NVMe controller 23 is, for example, data related to access to the NAND flash memory 4. More specifically, the data to be sent to the NVMe controller 23 is, for example, a read command or a write command for the NAND flash memory 4, or user data.

The PCIe link controller 22 includes a link width control unit 221. The link width control unit 221 controls a link width on the basis of information on commands issued by the host 2 to the memory system 3. The specific operation of the link width control unit 221 is described below with reference to FIG. 3 to FIG. 6.

The NVMe controller 23 is a circuit that processes a transaction such as a read command or a write command for the NAND flash memory 4. The NVMe controller 23 performs an operation according to a command in data that has been received from the host 2 via the PCIe PHY 21 and the PCIe link controller 22. The NVMe controller 23 also performs an operation to transmit data that includes a response to a command, to the host 2 via the PCIe link controller 22 and the PCIe PHY 21. The operations performed by the NVMe controller 23 conforms to, for example, the NVMe standard. In addition, the NVMe controller 23 manages command information 231.

The command information 231 includes information on one or more commands issued by the host 2 to the memory system 3. More specifically, the command information 231 includes information on, for example, the number of commands that have been issued by the host 2 but for which corresponding processes have not yet been performed in the memory system 3. The commands that have been issued by the host 2 but for which corresponding processes have not yet been performed in the memory system 3 are referred to as outstanding commands. The outstanding commands include: (a) commands that have been issued by the host 2 but have not yet been accepted by the memory system 3 (hereinafter referred to as unaccepted commands); (b) commands that have been issued by the host 2 and accepted by the memory system 3 but for which corresponding processes have not yet been executed in the memory system 3 (hereinafter referred to as unexecuted commands); and (c) commands that have been issued by the host 2 and accepted by the memory system 3, and for which corresponding processes have been partially executed in the memory system 3 but for which all the processes have not yet been completed (hereinafter referred to as uncompleted commands). A command that has been issued by the host 2 and accepted by the memory system 3 is a command in data that has been received from the host 2 via the PCIe PHY 21 and the PCIe link controller 22. The command information 231 includes, for example, information indicative of the total number of outstanding commands. The total number of outstanding commands may be one of the followings: the total number of unaccepted commands, the total number of unexecuted commands, and the total number of uncompleted commands. Alternatively, the total number of outstanding commands may be the sum of any two or more of the total number of unaccepted commands, the total number of unexecuted commands, and the total number of uncompleted commands.

Note that target commands managed with the command information 231 may be specific types of commands. The specific types of commands are, for example, read commands and write commands. In this case, the command information 231 includes, for example, information on the total number of read commands and write commands that have been issued by the host 2 but for which corresponding processes have not yet been performed in the memory system 3.

The issuance of a command by the host 2 means that, for example, the host 2 stores the command in a memory (e.g., a submission queue) in the host 2 and writes a value of a pointer indicative of a location where the command has been stored, to a register (i.e., a submission queue tail doorbell register) in the memory system 3. The acceptance of a command by the memory system 3 means that, for example, the memory system 3 (more specifically, the controller 6) has fetched the command from the memory in the host 2. The controller 6 may manage the number of unaccepted commands by using a difference between a pointer indicative of a location where a command is to be fetched (i.e., a submission queue head doorbell register) and the submission queue tail doorbell register.

The command information 231 may include information indicative of the amount of data that has not yet been transferred among data to be transferred from the host 2 to the memory system 3 in accordance with a command, and information indicative of the amount of data that has not yet been transferred among data to be transferred from the memory system 3 to the host 2 in accordance with a command. The data to be transferred from the host 2 to the memory system 3 in accordance with a command is, for example, user data to be written into the NAND flash memory 4 in accordance with a write command. The data to be transferred from the memory system 3 to the host 2 in accordance with a command is, for example, user data read from the NAND flash memory 4 in accordance with a read command. Hereinafter, the sum of the amount of data that has not yet been transferred among data to be transferred from the host 2 to the memory system 3 in accordance with a command and the amount of data that has not yet been transferred among data to be transferred from the memory system 3 to the host 2 in accordance with a command is referred to as a remaining data transfer amount.

Thus, the PCIe PHY 21, the PCIe link controller 22, and the NVMe controller 23 control and manage data transfer between the host 2 and the memory system 3.

Here, a link power state that is set for a link will be described. The link power state is a power state set for the link. For example, the link power state is set by the ASPM function specified in the PCIe standard. More specifically, the link power state is controlled, for example, by the PCIe link controller 22 having the ASPM function. The ASPM function is a function capable of setting the link to a low power consumption state even when a device (e.g., the memory system 3) is in an operating state. The link power state includes, for example, a link power state L0 and a link power state L1. The link power state L0 is a normal operating state (active state). The link power state L1 is a low power consumption state (inactive state).

The link power state L0 may include a link power state L0p. The link power state L0p is a link power state in the FLIT mode, which is newly specified in the PCIe Gen6. The FLIT mode is a mode that enables data retransmission at the physical layer. In the FLIT mode, data received from an upper layer is divided into, for example, FLIT packets in units of 256 bytes, and retransmission control in units of FLIT packets is performed. The link power state L0p is a link power state that enables data transfer while reducing power consumption. In the link power state L0p, at least one lane is maintained in the normal operating state (i.e., state of ready for data transfer). Therefore, in the link power state L0p, the link is never disconnected. In the link power state L0p, power consumption may be reduced by dynamically controlling the link width.

While the link is in the link power state L0p, each of the lanes of the link is set to either the normal operating state or the low power consumption state. The power consumption in the low power consumption state is lower than the power consumption in the normal operating state. A lane in the normal operating state is also referred to as an active lane. A lane in the low power consumption state is also referred to as an inactive lane. An inactive lane in a link that has transitioned to the link power state L0p is expected to consume as much less power as a lane in a link that has transitioned to the link power state L1. The link width is expressed by the number of active lanes N among the lanes of a link. The link width is expressed by, for example, "xN". In the PCIe standard, for example, in a case where a link is composed of eight lanes, the link width is set to one of x1, x2, x4, and x8. In other words, while the link is in the link power state L0p, one, two, four, or eight of the eight lanes are set to the normal operating state. The remaining lanes are set to the low power consumption state.

A state to which each of the eight lanes is set in a case where the link 31 has transitioned to the link power state L0p is specifically described. The eight lanes are described as a lane 0, a lane 1, . . . , and a lane 7.

FIG. 2 illustrates an example of states of lanes that are set according to the link width. FIG. 2 illustrates lane numbers of active lanes and lane numbers of inactive lanes in a case where the link width is xN. Note that the lane 0 is a lane that is always set to the normal operating state regardless of the link width. That is, the lane 0 is always an active lane regardless of the link width.

In a case where the link width is x1, the lane 0 is set to the normal operating state and seven lanes from the lane 1 to the lane 7 are set to the low power consumption state. That is, in this case, one lane (lane 0) corresponding to the link width x1 is an active lane, and the remaining seven lanes (lane 1 to lane 7) are inactive lanes.

In a case where the link width is x2, two lanes of the lane 0 and the lane 1 are set to the normal operating state and six lanes from the lane 2 to the lane 7 are set to the low power consumption state. That is, in this case, the two lanes (lane 0 and lane 1) corresponding to the link width x2 are active lanes, and the remaining six lanes (lane 2 to lane 7) are inactive lanes.

In a case where the link width is x4, four lanes from the lane 0 to the lane 3 are set to the normal operating state and four lanes from the lane 4 to the lane 7 are set to the low power consumption state. That is, in this case, the four lanes (lane 0 to lane 3) corresponding to the link width x4 are active lanes, and the remaining four lanes (lane 4 to lane 7) are inactive lanes.

In a case where the link width is x8, the eight lanes from the lane 0 to the lane 7 are set to the normal operating state.

That is, in this case, the eight lanes (lane 0 to lane 7) corresponding to the link width x8 are active lanes.

Here, a unit of lanes whose state transitions in a case where the link width is widened or narrowed will be explained.

In a case where the link width is widened, one or more lanes of the link 31 transition from the low power consumption state to the normal operating state in a specific unit corresponding to the link width to be widened. Specifically, in a case where the link width is widened from x1 to x2, one lane (lane 1) transitions from the low power consumption state to the normal operating state (T1 in FIG. 2). In a case where the link width is widened from x2 to x4, two lanes (lane 2 and lane 3) transition from the low power consumption state to the normal operating state (T2 in FIG. 2). In a case where the link width is widened from x4 to x8, four lanes (lane 4, lane 5, lane 6, and lane 7) transition from the low power consumption state to the normal operating state (T3 in FIG. 2).

Similarly, in a case where the link width is narrowed, one or more lanes of the link 31 transition from the normal operating state to the low power consumption state in a specific unit corresponding to the link width to be narrowed. Specifically, in a case where the link width is narrowed from x8 to x4, the four lanes (lane 4, lane 5, lane 6, and lane 7) transition from the normal operating state to the low power consumption state (T3 in FIG. 2). In a case where the link width is narrowed from x4 to x2, the two lanes (lane 2 and lane 3) transition from the normal operating state to the low power consumption state (T2 in FIG. 2). In a case where the link width is narrowed from x2 to x1, the one lane (lane 1) transitions from the normal operating state to the low power consumption state (T1 in FIG. 2).

Thus, in the link 31, the states of the lanes in the corresponding unit transition according to the link width being widened or narrowed. In the following, the one lane (lane 1) whose state transitions in a case where the link width changes between x1 and x2 is also referred to as the lane of a first group. The two lanes (lane 2 and lane 3) whose states transition in a case where the link width changes between x2 and x4 are also referred to as the lanes of a second group. The four lanes (lane 4, lane 5, lane 6, and lane 7) whose states transition in a case where the link width changes between x4 and x8 are also referred to as the lanes of a third group. Note that the lane 0, which is set to the normal operating state regardless of the link width, is also referred to as the lane of a 0th group.

Next, specific operations of the link width control unit 221 of the PCIe link controller 22 will be described with reference to FIG. 3 to FIG. 6. The link width control unit 221 determines the link width based on the command information 231. Then, the link width control unit 221 sets lanes that correspond to the determined link width to the normal operating state and sets the remaining lanes to the low power consumption state, via the PCIe PHY 21.

Specifically, the link width control unit 221 performs an operation to narrow the link width or an operation to widen the link width on the basis of the command information 231. The operation to narrow the link width is an operation to decrease the number of lanes set to the normal operating state and increase the number of lanes set to the low power consumption state among the lanes of the link 31 in response to a decrease in either the number of outstanding commands or the remaining data transfer amount. The operation to widen the link width is an operation to increase the number of lanes set to the normal operating state and decrease the number of lanes set to the low power consumption state among the lanes of the link 31 in response to an increase in either the number of outstanding commands or the remaining data transfer amount. In the following, the operation to narrow the link width and the operation to widen the link width will be described specifically. Note that, here, a case where the command information 231 indicates the total number of outstanding commands regarding read and write commands (hereinafter referred to as the number of outstanding read/write commands) will be explained as an example. It is also assumed that a maximum link width of the link 31 is x8.

Operation to Narrow Link Width

An operation in which the link width control unit 221 narrows the link width in response to a decrease in the number of outstanding read/write commands will be described. A threshold corresponding to a link width xn in the case of narrowing the link width will be described as TNn. The threshold TNn is a threshold compared with the number of outstanding read/write commands to determine whether or not to narrow the link width from the link width xn to a link width x(n/2). The threshold TNn is an integer of zero or larger. The threshold TNn corresponding to the link width xn is larger than a threshold TN(n/2) corresponding to the link width x(n/2).

Specifically, in a case where the maximum link width of the link 31 is x8, a threshold used to determine whether or not to narrow the link width from x8 to x4 is TN8. A threshold used to determine whether or not to narrow the link width from x4 to x2 is TN4. A threshold used to determine whether or not to narrow the link width from x2 to x1 is TN2. A threshold used to determine whether or not to narrow the link width from x1 to x0 (i.e., whether or not to transition from the link power state L0p to the link power state L1) is TN1. TN8 is larger than TN4. TN4 is larger than TN2. TN2 is larger than TN1. TN1 is, for example, zero.

FIG. 3 is a time chart illustrating a first control example of the link width by the link width control unit 221. The first control example illustrates a control example of a case in which the link width is narrowed in response to a decrease in the number of outstanding read/write commands.

Here, it is assumed that at time t10, the number of outstanding read/write commands is A and the link 31 is in the power state L0. While the link 31 is in the power state L0, the link width is x8 (maximum link width). Since the link width is x8, all the lanes (lane 0, lane 1, lane 2, lane 3, lane 4, lane 5, lane 6, and lane 7) are set to the normal operating state. Note that (A−1) illustrated in FIG. 3 is larger than (TN8+1).

At time t11, the number of outstanding read/write commands has decreased to (A−1). Since (A−1) is larger than the threshold TN8, the link width control unit 221 maintains the link width x8.

At time t12, the number of outstanding read/write commands has decreased to (TN8+1). Since (TN8+1) is larger than the threshold TN8, the link width control unit 221 maintains the link width x8.

At time t13, the number of outstanding read/write commands has decreased to TN8. The number of outstanding read/write commands is maintained at TN8 during a period p from time t13 to time t14.

At time t14, in response to the fact that the number of outstanding read/write commands has remained at the threshold TN8 or smaller for the period p or longer, the link width control unit 221 transitions the link 31 from the link power state L0 to the link power state L0p and narrows the link width from x8 to x4. The period p is a freely set duration. In the case of narrowing the link width from x8 to x4, the link width control unit 221 sets, for example, the lanes of the third group (lane 4, lane 5, lane 6, and lane 7) to the low power consumption state via the PCIe PHY 21.

Next, at time t15, the number of outstanding read/write commands has decreased to (TN4+1). Since (TN4+1) is larger than the threshold TN4, the link width control unit 221 maintains the link width x4.

At time t16, the number of outstanding read/write commands has decreased to TN4. The number of outstanding read/write commands is maintained at TN4 during the period p from time t16 to time t17.

At time t17, in response to the fact that the number of outstanding read/write commands has remained at the threshold TN4 or smaller for the period p or longer, the link width control unit 221 narrows the link width from x4 to x2. In the case of narrowing the link width from x4 to x2, the link width control unit 221 further sets, for example, the lanes of the second group (lane 2 and lane 3) to the low power consumption state via the PCIe PHY 21.

Next, at time t18, the number of outstanding read/write commands has decreased to (TN2+1). Since (TN2+1) is larger than the threshold TN2, the link width control unit 221 maintains the link width x2.

At time t19, the number of outstanding read/write commands has decreased to TN2. The number of outstanding read/write commands is maintained at TN2 during the period p from time t19 to time t20.

At time t20, in response to the fact that the number of outstanding read/write commands has remained at the threshold TN2 or smaller for the period p or longer, the link width control unit 221 narrows the link width from x2 to x1. In the case of narrowing the link width from x2 to x1, the link width control unit 221 further sets, for example, the lane of the first group (lane 1) to the low power consumption state via the PCIe PHY 21.

Next, at time t21, the number of outstanding read/write commands has decreased to (TN1+1). Since (TN1+1) is larger than the threshold TN1, the link width control unit 221 maintains the link width x1.

At time t22, the number of outstanding read/write commands has decreased to TN1. The number of outstanding read/write commands is maintained at TN1 during the period p from time t22 to time t23.

At time t23, in response to the fact that the number of outstanding read/write commands has remained at the threshold TN1 or smaller for the period p or longer, the link width control unit 221 transitions the link 31 from the link power state L0p to the link power state L1. Therefore, the link width becomes x0.

Through such control, the link width control unit 221 can narrow the link width gradually in response to the decrease in the number of outstanding read/write commands. Note that, in the first control example illustrated in FIG. 3, the number of outstanding read/write commands may be replaced by the remaining data transfer amount. In that case, the link width control unit 221 can narrow the link width gradually in response to a decrease in the remaining data transfer amount.

FIG. 4 is a flowchart illustrating an example of the procedure of a first link width control process executed by the link width control unit 221. The first link width control process is a process to narrow the link width in response to a decrease in the number of outstanding read/write commands. For example, while the link power state is in either L0 or L0p, the link width control unit 221 executes the first link width control process, for example, every period p. Note that a flag used in the first link width control process (hereinafter referred to as a first flag) is cleared, for example, in an initial state after the memory system 3 is booted up. The first flag is a flag indicating that the number of outstanding read/write commands becomes threshold or smaller.

First, the link width control unit 221 acquires the number of outstanding read/write commands (step S101). The link width control unit 221 acquires the threshold TNn (step S102), which is used for determination whether to narrow the link width from the current link width xn. Then, the link width control unit 221 determines whether or not the number of outstanding read/write commands is the threshold TNn or smaller (step S103).

When the number of outstanding read/write commands is larger than the threshold TNn (no in step S103), the link width control unit 221 determines whether or not the first flag has been set (step S104).

When the first flag has been set (yes in step S104), the link width control unit 221 clears the first flag (step S105) and ends the first link width control process. That is, since the state in which the number of outstanding read/write commands is the threshold TNn or smaller does not continue for the period p or longer, the first link width control process is ended without narrowing the link width.

When the first flag has not been set (no in step S104), the link width control unit 221 ends the first link width control process. That is, since the number of outstanding read/write commands is larger than the threshold TNn, the first link width control process is ended without narrowing the link width.

When the number of outstanding read/write commands is the threshold TNn or smaller (yes in step S103), the link width control unit 221 determines whether or not the first flag has been set (step S106).

When the first flag has not been set (no in step S106), the link width control unit 221 sets the first flag (step S107) and ends the first link width control process.

When the first flag has been set (yes in step S106), the link width control unit 221 determines whether or not the link 31 is in the link power state L0 (step S108).

When the link 31 is in the link power state L0 (yes in step S108), the link width control unit 221 transitions the link 31 from the link power state L0 to the link power state L0p (step S109). The link width control unit 221 narrows the link width to half (step S110). Then, the link width control unit 221 clears the first flag (step S111) and ends the first link width control process.

When the link 31 is not in the link power state L0 (no in step S108), that is, when the link 31 is in the link power state L0p, the link width control unit 221 determines whether or not the number of outstanding read/write commands is zero (step S112).

When the number of outstanding read/write commands is not zero (no in step S112), the link width control unit 221 narrows the link width to half (step S110). Then, the link width control unit 221 clears the first flag (step S111) and ends the first link width control process.

When the number of outstanding read/write commands is zero (yes in step S112), the link width control unit 221 transitions the link 31 from the link power state L0p to the link power state L1 (step S113). Then, the link width control unit 221 clears the first flag (step S111) and ends the first link width control process.

With the first link width control process described above, when the state in which the number of outstanding read/ write commands is the threshold TNn or smaller continues for the period p or longer, the link width control unit 221 narrows the link width to half. When the state in which the number of outstanding read/write commands is the threshold TNn or smaller continues for the period p or longer, and the number of outstanding read/write commands is zero, the link width control unit 221 transitions the link 31 from the link power state L0p to the link power state L1. As a result, in the memory system 3, when the number of outstanding read/write commands has decreased, power consumption can be reduced while required performance of data transfer on the link 31 can be maintained. Therefore, the memory system 3 can maintain a balance between the performance of data transfer and power consumption of the link 31 in accordance with the number of outstanding read/write commands.

Note that the link width control unit 221 may execute the first link width control process by modifying the process such that the number of outstanding read/write commands is replaced with the remaining data transfer amount. In that case, the memory system 3 can maintain a balance between the performance of data transfer and power consumption of the link 31 in accordance with the remaining data transfer amount.

Operation to Widen Link Width

Next, an operation in which the link width control unit 221 widens the link width in response to an increase in the number of outstanding read/write commands will be described. A threshold corresponding to the link width xn in the case of widening the link width will be described as TWn. The threshold TWn is a threshold used to determine whether or not to widen the link width from a link width xn to a link width x(2n). The threshold TWn is an integer of one or more. The threshold TWn corresponding to the link width xn is smaller than a threshold TW(2n) corresponding to the link width x(2n).

Specifically, in a case where the maximum link width of the link 31 is x8, a threshold used to determine whether or not to widen the link width from x1 to x2 is TW1. A threshold used to determine whether or not to widen the link width from x2 to x4 is TW2. A threshold used to determine whether or not to widen the link width from x4 to x8 is TW4. TW1 is smaller than TW2. TW2 is smaller than TW4.

FIG. 5 is a time chart illustrating a second control example of the link width by the link width control unit 221. The second control example illustrates a control example of a case in which the link width is widened in response to an increase in the number of outstanding read/write commands.

Here, it is assumed that at time t50, the number of outstanding read/write commands is zero, and the link 31 is in the power state L0p with a link width x1. Since the link width is x1, the lane of the 0th group (lane 0) is set to the normal operating state, while the other lanes of the group 1, the group 2, and the group 3 (lane 1, lane 2, lane 3, lane 4, lane 5, lane 6, and lane 7) are set to the low power consumption state. Note that (TW1−1) illustrated in FIG. 5 is larger than one.

At time t51, the number of outstanding read/write commands has increased to one. Since one is smaller than the threshold TW1, the link width control unit 221 maintains the link width x1.

At time t52, the number of outstanding read/write commands has increased to (TW1−1). Since (TW1−1) is smaller than the threshold TW1, the link width control unit 221 maintains the link width x1.

At time t53, the number of outstanding read/write commands has increased to TW1. The number of outstanding read/write commands is maintained at TW1 during a period q from time t53 to time t54.

At time t54, in response to the fact that the number of outstanding read/write commands has remained at the threshold TW1 or larger for the period q or longer, the link width control unit 221 widens the link width from x1 to x2. The period q is a freely set duration. The period q may be the same as or different from the period p. In the case of widening the link width from x1 to x2, the link width control unit 221 sets, for example, the lane of the first group (lane 1) to the normal operating state via the PCIe PHY 21.

Next, at time t55, the number of outstanding read/write commands has increased to (TW2−1). Since (TW2−1) is smaller than the threshold TW2, the link width control unit 221 maintains the link width x2.

At time t56, the number of outstanding read/write commands has increased to TW2. The number of outstanding read/write commands is maintained at TW2 during the period q from time t56 to time t57.

At time t57, in response to the fact that the number of outstanding read/write commands has remained at the threshold TW2 or larger for the period q or longer, the link width control unit 221 widens the link width from x2 to x4. In the case of widening the link width from x2 to x4, the link width control unit 221 further sets, for example, the lanes of the second group (lane 2 and lane 3) to the normal operating state via the PCIe PHY 21.

Next, at time t58, the number of outstanding read/write commands has increased to (TW4−1). Since (TW4−1) is smaller than the threshold TW4, the link width control unit 221 maintains the link width x4.

At time t59, the number of outstanding read/write commands has increased to TW4. The number of outstanding read/write commands is maintained at TW4 during the period q from time t59 to time t60.

At time t60, in response to the fact that the number of outstanding read/write commands has remained at the threshold TW4 or larger for the period q or longer, the link width control unit 221 transitions the link 31 from the link power state L0p to the link power state L0. Therefore, the link width becomes x8.

Through such control, the link width control unit 221 can widen the link width gradually in accordance with the increase in the number of outstanding read/write commands. Note that, in the second control example illustrated in FIG. 5, the number of outstanding read/write commands may be replaced by the remaining data transfer amount. In that case, the link width control unit 221 can widen the link width gradually in accordance with an increase in the remaining data transfer amount.

The operation to narrow the link width and the operation to widen the link width by the link width control unit 221 may have hysteresis. In this case, for example, the threshold TWn, which is used to determine whether or not to widen the link width from the link width xn to the link width x(2n), is set to a larger value than the threshold TN(2n), which is used to determine whether or not to narrow the link width from the link width x(2n) to the link width xn. If the threshold TWn and the threshold TN(2n) were the same value, the link width might be frequently switched between the link width xn and the link width x(2n) in response to a change by one in the number of outstanding read/write commands. In the memory system 3 of the present embodiment, the threshold TWn is set to a value larger than the threshold TN(2n), thereby avoiding frequent switching between the link width xn and the link width x(2n).

FIG. 6 is a flowchart illustrating an example of the procedure of a second link width control process executed by the link width control unit 221. The second link width control process is a process to widen the link width in response to an increase in the number of outstanding read/write commands. For example, while the link power state is in L0p, the link width control unit 221 executes the second link width control process, for example, every period q. Note that a flag used in the second link width control process (hereinafter referred to as a second flag) is cleared, for example, in the initial state after the memory system 3 is booted up. The second flag is a flag indicating that the number of outstanding read/write commands becomes the threshold or larger.

First, the link width control unit 221 acquires the number of outstanding read/write commands (step S201). The link width control unit 221 acquires the threshold TWn (step S202), which is used for determination whether to widen the link width from the current link width xn. Then, the link width control unit 221 determines whether the number of outstanding read/write commands is the threshold TWn or larger (step S203).

When the number of outstanding read/write commands is smaller than the threshold TWn (no in step S203), the link width control unit 221 determines whether or not the second flag has been set (step S204).

When the second flag has been set (yes in step S204), the link width control unit 221 clears the second flag (step S205) and ends the second link width control process. That is, since the state in which the number of outstanding read/write commands is the threshold TWn or larger does not continue for the period q or longer, the second link width control process is ended without widening the link width.

When the second flag has not been set (no in step S204), the link width control unit 221 ends the second link width control process. That is, since the number of outstanding read/write commands is smaller than the threshold TWn, the second link width control process is ended without widening the link width.

When the number of outstanding read/write commands is the threshold TWn or larger (yes in step S203), the link width control unit 221 determines whether or not the second flag has been set (step S206).

When the second flag has not been set (no in step S206), the link width control unit 221 sets the second flag (step S207) and ends the second link width control process.

When the second flag has been set (yes in step S206), the link width control unit 221 determines whether or not the link width widened from the current link width is the maximum link width (step S208).

When the link width widened from the current link width is the maximum link width (yes in step S208), the link width control unit 221 transitions the link 31 from the link power state L0p to the link power state L0 (step S209). Then, the link width control unit 221 clears the second flag (step S210) and ends the second link width control process.

When the link width widened from the current link width is not the maximum link width (no in step S208), the link width control unit 221 doubles the link width (step S211). Then, the link width control unit 221 clears the second flag (step S210) and ends the second link width control process.

With the second link width control process described above, when the state in which the number of outstanding read/write commands is the threshold TWn or larger continues for the period q or longer, the link width control unit 221 doubles the link width. When the doubled link width is the maximum link width, the link width control unit 221 transitions the link 31 from the link power state L0p to the link power state L0. As a result, in the memory system 3, when the number of outstanding read/write commands has increased, required performance of data transfer on the link 31 can be ensured while power consumption can be reduced. Therefore, the memory system 3 can maintain a balance between the performance of data transfer and power consumption of the link 31 in accordance with the number of outstanding read/write commands.

Note that the link width control unit 221 may execute the second link width control process by modifying the process such that the number of outstanding read/write commands is replaced with the remaining data transfer amount. In that case, the memory system 3 can maintain a balance between the performance of data transfer and power consumption of the link 31 in accordance with the remaining data transfer amount.

The link width control unit 221 may further use the data storage completion information 141 and the output preparation completion information 121 in each of the operation to narrow the link width and the operation to widen the link width.

Specifically, for example, in response to the data storage completion information 141 indicating that storage of write data in the SRAM 16 has been completed, the link width control unit 221 may narrow the current link width xn to the link width x(n/2). This is because the bandwidth required for data transfer from the host 2 to the memory system 3 is expected to decrease due to the completion of storing the write data in the SRAM 16, which was to be transferred from the host 2 to the memory system 3.

For example, in response to the data storage completion information 141 indicating that storage of read data in the SRAM 16 has been completed, the link width control unit 221 may widen the current link width xn to the link width x(2n). This is because the read data stored in the SRAM 16 is data to be transferred from the memory system 3 to the host 2, and so the band width required for data transfer from the memory system 3 to the host 2 is expected to increase.

For example, in response to the output preparation completion information 121 indicating that user data (read data) to be read from the NAND flash memory 4 in accordance with a read command is ready to be output to the SRAM 16, the link width control unit 221 may widen the current link width xn to the link width x(2n). This is because the read data to be output from the NAND flash memory 4 is data to be transferred from the memory system 3 to the host 2 after being stored in the SRAM 16, and so the bandwidth required for data transfer from the memory system 3 to the host 2 is expected to increase.

By further using the data storage completion information 141 and the output preparation completion information 121, the link width control unit 221 can control the link width more finely than in the case of using only the command information 231.

As explained above, according to the present embodiment, a balance between performance and power consumption related to data transfer can be maintained. The link width control unit 221 determines lanes to be set to the operating state (normal operating state) among the plurality of lanes of the link 31 between the host 2 and the memory system 3, based on first information on one or more commands issued by the host 2. The link width control unit 221 sets the determined lanes among the plurality of lanes to the operating state (normal operating state). The link width control unit 221 sets lanes other than the determined lanes among the plurality of lanes to the low power consumption state. The power consumption in the low power consumption state is lower than the power consumption in the operating state (normal operating state).

Thus, in the memory system 3, the link width is controlled on the basis of the information on the one or more commands issued by the host 2 to the memory system 3. This enables a balance to be maintained between performance and power consumption related to data transfer over the link 31.

Each of the various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
   a random access memory;
   a nonvolatile memory; and
   a controller electrically connected to the nonvolatile memory and configured to:
      determine lanes to be set to an operating state among a plurality of lanes of a link between the host and the memory system, based on first information on one or more commands issued by the host, the first information including storage completion information indicating that data to be written into the nonvolatile memory in accordance with at least one of the one or more commands has been stored in the random access memory;
      decrease the number of the lanes set to the operating state in accordance with the storage completion information;
      set the determined lanes among the plurality of lanes to the operating state; and
      set lanes other than the determined lanes among the plurality of lanes to a low power consumption state.

2. The memory system of claim 1, wherein
   the first information further includes information on a first number of commands that have been issued by the host but for which corresponding processes have not yet been performed in the memory system, and
   the controller is further configured to:
      as the first number of commands increase, increase the number of the lanes set to the operating state; and as the first number of commands decrease, decrease the number of the lanes set to the operating state.

3. The memory system of claim 1, wherein the first information further includes information on a second number of commands that have been issued by the host but have not yet been accepted by the memory system, and the controller is further configured to:

as the second number of commands increase, increase the number of the lanes set to the operating state; and as the second number of commands decrease, decrease the number of the lanes set to the operating state.

4. The memory system of claim 1, wherein the first information further includes information on a third number of commands that have been issued by the host and accepted by the memory system, but for which corresponding processes have not yet been executed in the memory system, and the controller is further configured to:

as the third number of commands increase, increase the number of the lanes set to the operating state; and as the third number of commands decrease, decrease the number of the lanes set to the operating state.

5. The memory system of claim 1, wherein the first information further includes information on a fourth number of commands that have been issued by the host and accepted by the memory system, and for which corresponding processes have been partially executed in the memory system but for which all the processes have not yet been completed, and the controller is further configured to:

as the fourth number of commands increase, increase the number of the lanes set to the operating state; and as the fourth number of commands decrease, decrease the number of the lanes set to the operating state.

6. The memory system of claim 1, wherein the first information further includes information indicative of a first data amount and information indicative of a second data amount, the first data amount being an amount of data that has not yet been transferred among data to be transferred from the host to the memory system in accordance with at least one of the one or more commands, the second data amount being an amount of data that has not yet been transferred among data to be transferred from the memory system to the host in accordance with at least one of the one or more commands, and the controller is further configured to:

as a sum of the first data amount and the second data amount increases, increase the number of the lanes set to the operating state; and as the sum decreases, decrease the number of the lanes set to the operating state.

7. The memory system according to claim 1, wherein the controller is configured to determine the lanes to be set to the operating state while the link is in a link power state L0p specified in a PCIe standard.

8. A memory system connectable to a host, comprising:

a random access memory;

a nonvolatile memory; and a controller electrically connected to the nonvolatile memory and configured to:

determine lanes to be set to an operating state among a plurality of lanes of a link between the host and the memory system, based on first information on one or more commands issued by the host, the first information including storage completion information indicating that data read from the nonvolatile memory in accordance with at least one of the one or more commands has been stored in the random access memory;

increase the number of the lanes set to the operating state in accordance with the storage completion information;

set the determined lanes among the plurality of lanes to the operating state; and set lanes other than the determined lanes among the plurality of lanes to a low power consumption state.

9. The memory system of claim 8, wherein the first information further includes information on a first number of commands that have been issued by the host but for which corresponding processes have not yet been performed in the memory system, and the controller is further configured to:

as the first number of commands increase, increase the number of the lanes set to the operating state; and as the first number of commands decrease, decrease the number of the lanes set to the operating state.

10. The memory system of claim 8, wherein the first information further includes information on a second number of commands that have been issued by the host but have not yet been accepted by the memory system, and the controller is further configured to:

as the second number of commands increase, increase the number of the lanes set to the operating state; and as the second number of commands decrease, decrease the number of the lanes set to the operating state.

11. The memory system of claim 8, wherein the first information further includes information on a third number of commands that have been issued by the host and accepted by the memory system, but for which corresponding processes have not yet been executed in the memory system, and the controller is further configured to:

as the third number of commands increase, increase the number of the lanes set to the operating state; and as the third number of commands decrease, decrease the number of the lanes set to the operating state.

12. The memory system of claim 8, wherein the first information further includes information on a fourth number of commands that have been issued by the host and accepted by the memory system, and for which corresponding processes have been partially executed in the memory system but for which all the processes have not yet been completed, and the controller is further configured to:

as the fourth number of commands increase, increase the number of the lanes set to the operating state; and as the fourth number of commands decrease, decrease the number of the lanes set to the operating state.

13. The memory system of claim 8, wherein the first information further includes information indicative of a first data amount and information indicative of a second data amount, the first data amount being an amount of data that has not yet been transferred among data to be transferred from the host to the memory system in accordance with at least one of the one or more commands, the second data amount being an amount of data that has not yet been transferred among data to be transferred from the memory system to the host in accordance with at least one of the one or more commands, and the controller is further configured to:

as a sum of the first data amount and the second data amount increases, increase the number of the lanes set to the operating state; and as the sum decreases, decrease the number of the lanes set to the operating state.

14. The memory system according to claim 8, wherein the controller is configured to determine the lanes to be set to the operating state while the link is in a link power state L0p specified in a PCIe standard.

15. A memory system connectable to a host, comprising:

a random access memory;

a nonvolatile memory; and a controller electrically connected to the nonvolatile memory and configured to:

determine lanes to be set to an operating state among a plurality of lanes of a link between the host and the memory system, based on first information on one or more commands issued by the host, the first information including output preparation completion information indicating that data to be read from the nonvolatile memory in accordance with at least one of the one or more commands is ready to be output from the nonvolatile memory to the random access memory;

increase the number of the lanes set to the operating state in accordance with the output preparation completion information;

set the determined lanes among the plurality of lanes to the operating state; and set lanes other than the determined lanes among the plurality of lanes to a low power consumption state.

16. The memory system of claim 15, wherein the first information further includes information on a first number of commands that have been issued by the host but for which corresponding processes have not yet been performed in the memory system, and the controller is further configured to:

as the first number of commands increase, increase the number of the lanes set to the operating state; and as the first number of commands decrease, decrease the number of the lanes set to the operating state.

17. The memory system of claim 15, wherein the first information further includes information on a second number of commands that have been issued by the host but have not yet been accepted by the memory system, and the controller is further configured to:

as the second number of commands increase, increase the number of the lanes set to the operating state; and as the second number of commands decrease, decrease the number of the lanes set to the operating state.

18. The memory system of claim 15, wherein the first information further includes information on a third number of commands that have been issued by the host and accepted by the memory system, but for which corresponding processes have not yet been executed in the memory system, and the controller is further configured to:

as the third number of commands increase, increase the number of the lanes set to the operating state; and as the third number of commands decrease, decrease the number of the lanes set to the operating state.

19. The memory system of claim 15, wherein the first information further includes information on a fourth number of commands that have been issued by the host and accepted by the memory system, and for which corresponding processes have been partially executed in the memory system but for which all the processes have not yet been completed, and the controller is further configured to:

as the fourth number of commands increase, increase the number of the lanes set to the operating state; and as the fourth number of commands decrease, decrease the number of the lanes set to the operating state.

20. The memory system of claim 15, wherein the first information further includes information indicative of a first data amount and information indicative of a second data amount, the first data amount being an amount of data that has not yet been transferred among data to be transferred from the host to the memory system in accordance with at least one of the one or more commands, the second data amount being an amount of data that has not yet been transferred among data to be transferred from the memory system to the host in accordance with at least one of the one or more commands, and the controller is further configured to:

as a sum of the first data amount and the second data amount increases, increase the number of the lanes set to the operating state; and as the sum decreases, decrease the number of the lanes set to the operating state.

21. The memory system according to claim 15, wherein the controller is configured to determine the lanes to be set to the operating state while the link is in a link power state L0p specified in a PCIe standard.

* * * * *